US012631238B2

(12) United States Patent
Vulpetti et al.

(10) Patent No.: US 12,631,238 B2

(45) Date of Patent: May 19, 2026

(54) BELT CLOSER AND METHOD FOR CLOSING BELTS

(71) Applicant: Laitram, L.L.C., Harahan, LA (US)

(72) Inventors: Matthew Vulpetti, Metairie, LA (US); Daniel E. Jackson, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 392 days.

(21) Appl. No.: 18/266,056

(22) PCT Filed: Dec. 22, 2021

(86) PCT No.: PCT/US2021/064801

§ 371 (c)(1),
(2) Date: Jun. 8, 2023

(87) PCT Pub. No.: WO2022/159230

PCT Pub. Date: Jul. 28, 2022

(65) Prior Publication Data

US 2024/0026951 A1     Jan. 25, 2024

Related U.S. Application Data

(60) Provisional application No. 63/139,064, filed on Jan. 19, 2021.

(51) Int. Cl.
| | |
|---|---|
| *F16G 3/00* | (2006.01) |
| *B65G 15/30* | (2006.01) |
| *B65G 15/42* | (2006.01) |
| *F16G 3/02* | (2006.01) |

(52) U.S. Cl.
CPC .............. *F16G 3/006* (2013.01); *F16G 3/02* (2013.01)

(58) Field of Classification Search
None
See application file for complete search history.

(56) References Cited

U.S. PATENT DOCUMENTS

| | | | |
|---|---|---|---|
| 457,012 A | 8/1891 | Roberts | |
| 1,389,760 A * | 9/1921 | Humbert | F16G 3/006 |
| | | | 269/246 |
| 3,574,898 A * | 4/1971 | Scott | F16G 3/006 |
| | | | 24/32 |
| 7,383,943 B1 * | 6/2008 | Davis, Jr. | B65G 19/00 |
| | | | 198/860.1 |

FOREIGN PATENT DOCUMENTS

| | | |
|---|---|---|
| FR | 630774 A | 12/1927 |
| GB | 10012 A | 1/1915 |

OTHER PUBLICATIONS

Intralox Maintenance Manual Y-Sorter, pp. 1, 2, 43, 44, 49, 50, copyright 2020, Intralox, L.L.C., Harahan, Louisiana, U.S.A.
Intralox Maintenance Manual Manual Induct + Straight Line Sorter, pp. 1, 2, 56-66, copyright 2019, Intralox, L.L.C., Harahan, Louisiana, U.S.A.

* cited by examiner

*Primary Examiner* — Kavel Singh
(74) *Attorney, Agent, or Firm* — James T. Cronvich

(57)     ABSTRACT

A method for closing modular belts and a belt closer having two clamps for clamping to a side edge of a modular flat-top conveyor belt. A ratchet strap or other pulling tool is connected between the two clamps of the belt closer. Once the clamps are clamped to unconnected end sections of a belt, the ratchet strap is used to pull the two sections together so that they can be joined by a hinge rod to form an endless belt.

33 Claims, 3 Drawing Sheets

BELT CLOSER AND METHOD FOR CLOSING BELTS

BACKGROUND

The invention relates to tools for closing modular conveyor belts and methods for their use in closing belts.

Modular conveyor belts are constructed of a series of rows of belt modules linked together by hinge rods into a conveyor belt capable of articulating about the hinge rods at hinge joints between consecutive rows. A new belt is received with its opposite ends unconnected to each other. The length of belt is installed in a conveyor around drive and idle sprockets and is supported in a lower return by shoes or rollers and in an upper carryway by wear strips. During installation or maintenance the unconnected opposite ends of the belt are pulled together to close the belt so that a hinge rod can be inserted at the hinge joint between the two rows at the opposite ends of the length of belt. Once the hinge rod is inserted, the belt forms an endless belt loop.

Before the opposite ends of the belt are joined, the weight of the belt in the return tends to pull the two ends apart. Pulling those ends together by hand on the carryway is difficult—especially for long, wide, and heavy belts. Belt pullers that hook into openings through the thickness of the belts at each end and connected by ratchet straps are commonly used to pull the opposite belt ends together. But pullers that work well with belts having plenty of open area do not work with belts having little or no open area.

SUMMARY

One version of a belt closer embodying features of the invention comprises a pair of clamps and a pulling tool having a first end attached to one of the clamps at an attachment point and a second end attached to the other of the clamps at its attachment point. Each of the clamps includes a C-shaped frame and a movable jaw' The frame has a first end and a second end spaced apart across an opening into a throat. A fixed jaw is at the first end. And the frame also includes the attachment point. A movable jaw has an outer end outside the frame and an inner end in the throat of the C-shaped frame. A jaw head of the movable jaw is at the at inner end. A jaw adjuster at the outer end moves the jaw head toward the fixed jaw to a clamped position and away from the fixed jaw in an unclamped position.

One version of a belt-closer clamp comprises a C-shaped frame having a first end and a second end spaced apart across an opening into a throat, a fixed jaw at the first end, a threaded through hole at the second end, and an attachment point. A screw threaded through the through hole has an outer end outside the frame and an inner end in the throat of the C-shaped frame. An adjustment head at the outer end of the screw is used to turn the screw to move the screw along the threaded through hole. A jaw head the at inner end of the screw forms a movable jaw movable toward the fixed jaw to a clamped position and away from the fixed jaw in an unclamped position.

Another version of a belt-closer clamp comprises a C-shaped frame having a first end and a second end spaced apart across an opening into a throat, a fixed jaw at the first end, a slot in the second end, a pivot pin spanning the slot, and a cam latch pivotably mounted in the slot on the pivot pin. The cam latch has an outer end outside the frame and an inner end in the throat of the C-shaped frame. A lever at the outer end of the cam latch pivots the cam latch in the slot. A cam at the inner end forms a movable jaw movable by the lever between a clamped position confronting the fixed jaw and an unclamped position deeper in the throat of the C-shaped frame.

One version of a method for pulling separated end sections of a modular conveyor belt together comprises: (a) attaching a first pulling tool between a first pair of clamps; (b) attaching a second pulling tool between a second pair of clamps; (c) installing a first one of the first pair of clamps at a first side edge of the belt in a first end section so that an edge portion of a first conveyor belt module in the first end section is between the clamp's jaws; (d) installing a second one of the first pair of clamps at the first side edge of the belt in the second end section so that an edge portion of a first conveyor belt module in the second end section is between the clamp's jaws; (e) clamping the first and second ones of the first pair of clamps around the first conveyor belt modules of the first and second end sections; (f) installing a first one of the second pair of clamps at a second side edge of the belt in the first end section so that an edge portion of a second conveyor belt module in the first end section is between the clamp's jaws; (g) installing a second one of the second pair of clamps at the second side edge of the belt in the second end section so that an edge portion of a second conveyor belt module in the second end section is between the clamp's jaws; (h) clamping the first and second ones of the second pair of clamps around the second conveyor belt modules of the first and second end sections; and (i) adjusting the first and second pulling tools to pull the first and second end sections together.

DETAILED DESCRIPTION

Figure 1:
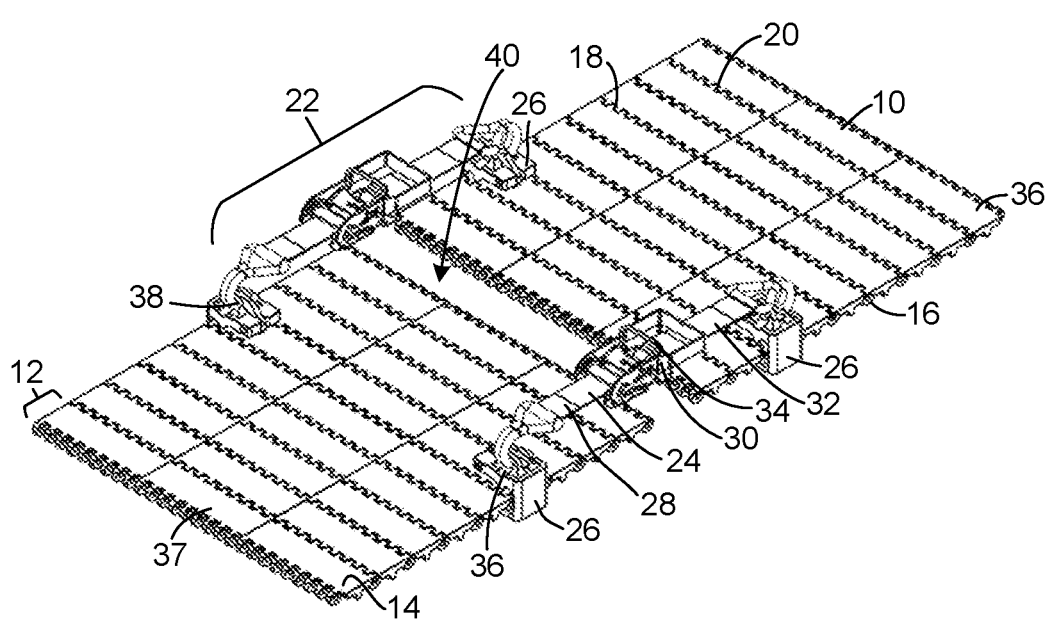
FIG. 1 is an isometric view of a section of a conveyor belt with one version of a belt closer attached.
Figure 2:
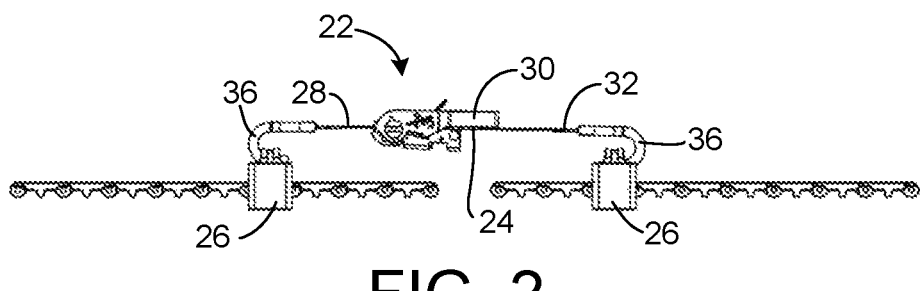
FIG. 2 is a side elevation view of the belt section of FIG. 1.
Figure 3:
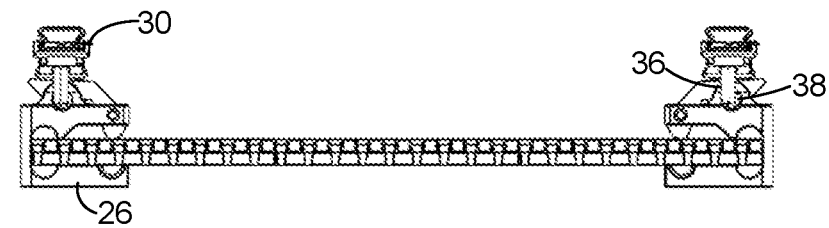
FIG. 3 is an end elevation view of the belt section of FIG. 1.

A portion of a modular conveyor belt 10 with one version of belt closers 22 at each side edge is shown in FIGS. 1-3. The conveyor belt 10 is a modular flat-top belt with no open area. The belt is constructed of a series of rows 12 of belt modules 14. The rows 12 are linked together by hinge rods 16 received in a lateral passageway formed by aligned eyes in interleaved hinge elements 18 of adjacent rows. The belt 10 articulates about the hinge rods 16 at hinge joints 20 between each row 12.

Each belt closer 22 includes a pulling tool, such as a conventional ratchet strap 24, and two clamps 26. The ratchet strap 24 includes a fixed length of webbing 28 attached at one end of a central ratchet mechanism 30. A free end of a second length of webbing 32 extends through the ratchet mechanism 30. A handle 34 is manually pumped to advance the second length of webbing 32 through the ratchet and pull the two sections 36, 37 of belt together. The clamps 26 of each belt closer 22 clamp to opposite side edges of the belt sections 36, 37 across a gap 40 between the two sections. Other pulling tools, such as come-alongs, winches, and rope or cable systems with or without ratchets, connected between the two clamps 26 can alternatively be used.

Once the two belt sections 36, 37 are pulled together by the closers 22, their hinge elements interleaved, and their hinge eyes laterally aligned, a hinge rod 16 is inserted in the lateral passageway at the hinge joint to close the belt loop. To avoid interfering with the insertion of the hinge rod 16, the clamps 26 are clamped to belt rows that are a few rows inward of the rows at the ends of the two belt sections 36, 37. But if interference isn't a problem, the clamps 26 could be clamped to the endmost rows. The two pairs of closer clamps 26 can then be opened and removed from the side edges of the belt 10. Hooks 39 at the ends of the webbings 28, 32 hook into eye holes 38 at attachment points on the clamps 26 to attach the ratchet straps 24 to the clamps.

Figures 4A, 4B, 5, 6, 7:
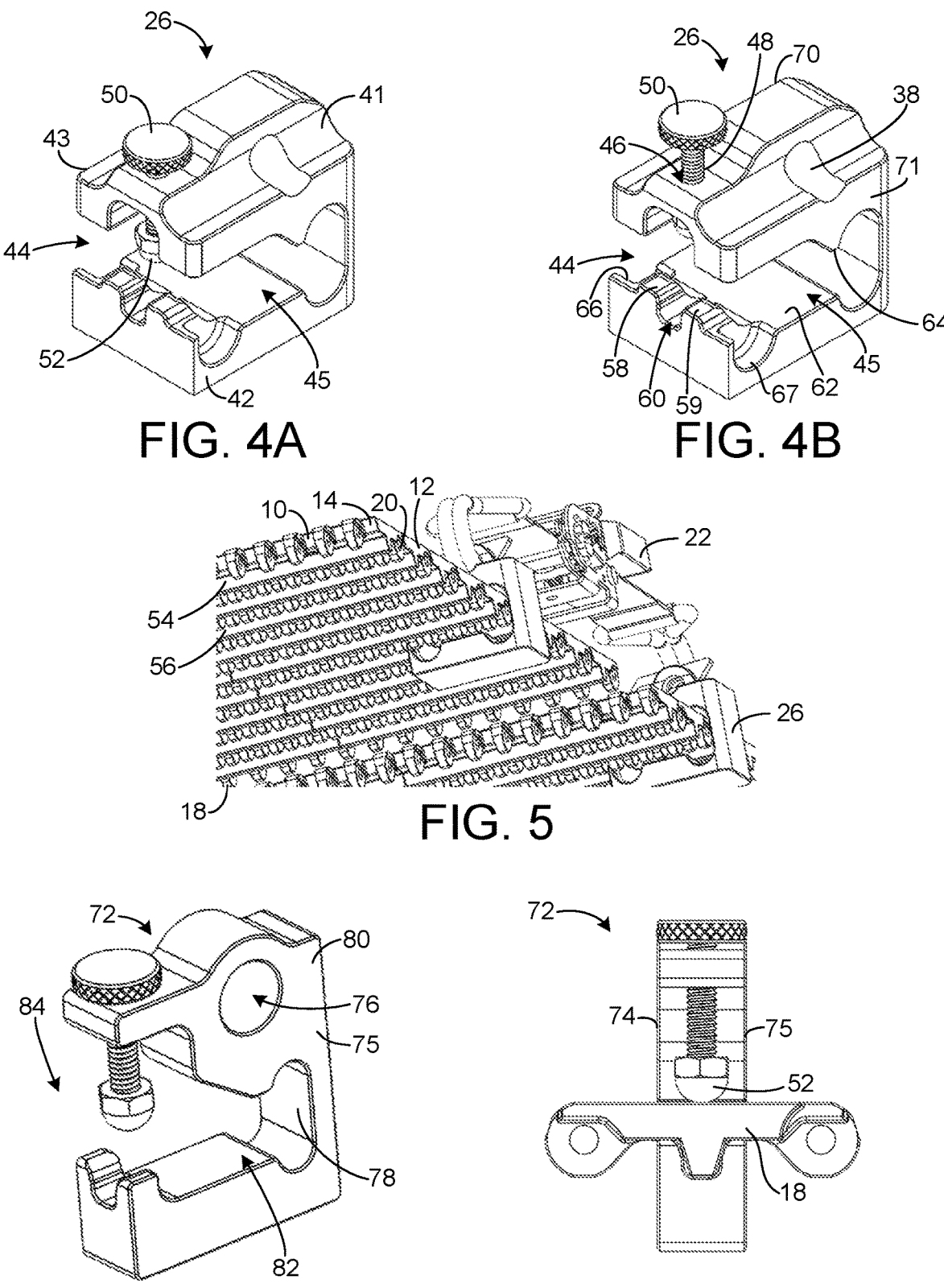
FIGS. 4A and 4B are isometric views of a clamp in the belt closer of FIG. 1 shown in clamped and unclamped states.
FIG. 5 is an underside view of the belt section of FIG. 1.
FIG. 6 is an isometric view of another version of a clamp usable in a belt closer for a conveyor belt as in FIG. 1.
FIG. 7 is a front elevation view of the clamp of FIG. 6 clamping a belt module.

FIGS. 4A and 4B show details of the clamps 26 in clamped and unclamped states. The clamp 26 has a C-shaped frame 41 with first and second ends 42, 43 of the C spaced apart across an opening 44 into a throat 45. The first end 42 of the frame 41 forms a fixed jaw of the clamp 26. A threaded through hole 46 extends through the thickness of the second end 43 of the frame 41. A screw 48 is received in the threaded through hole 46. The screw 48 has a jaw adjuster in the form of a finger-adjustment head 50 at an outer end of the screw outside the frame 41 and a jaw head 52 at an inner end of the screw in the clamp's throat 45. Turning the head 50 at the outer end of the screw 48 clockwise advances the screw through the threaded through hole 46 toward the fixed jaw at the first end 42 of the clamp 26 and into a clamped state as in FIG. 4A. Turning the head 50 of the screw 48 counterclockwise advances the screw through the through hole 46 away from the fixed jaw at the first end 42 of the frame 41 and toward an unclamping state as shown in FIG. 4B. The screw 48 with its finger-adjustment head 50 and jaw head 52 form a movable clamp jaw confronting the fixed jaw. The bottom of the jaw head 52 is smooth so that it doesn't score the belt 10 when it clamps against it as in FIG. 5. In the example shown in FIGS. 4A and 4B the jaw head 52 is domed and realized as an acorn nut, for example, threaded onto the inner end of the screw 48.

As shown in FIG. 5, the belt 10 has a lateral rib 54 midway between the hinge joints 20 of each belt row 12. The rib 54 extends downward from a bottom surface 56 of the modules 14. Each clamp 26 is designed to mate with the modules 14. As shown in FIG. 4B, the clamp 26 has a pair of raised jaw pads 58, 59 at the fixed jaw separated by a channel 60 that extends from the clamp's opening 44 and into its throat 45. The channel 60 mates with and receives the belt's lateral rib 54 as the clamp 26 is slid onto one of the belt modules 14 from a side edge. Although the clamp 26 is shown in this example clamped onto a single belt row, clamps that clamp onto adjacent belt rows are also possible. The C-shaped frame 41 also includes a lower inner pad 62 deeper into the throat than the jaw pads 58, 59. The bottom of the channel 60 is flush with the top of the lower inner pad 62, which extends across the width of the clamp 26 to provide further support for the belt 10 at its bottom surface (56, FIG. 5). An upper inner pad 64 extends into the clamp's throat 45 across from the lower inner pad 62. Hollows 66, 67 on the sides of the jaw pads 58, 59 opposite the channel 60 receive the belt's hinge elements (18, FIG. 5) to further stabilize the belt 10 in the clamp 26. The attachment hole 38 extends through the frame 41 from a first side 70 to a second side 71 and receives the hooks (39, FIG. 2) at the ends of the ratchet strap 24.

Another version of a clamp for a belt closer is shown in FIGS. 6 and 7. The clamp 72 differs from the clamp 26 of FIGS. 4A and 4B in that it is narrower between opposite first and second sides 74, 75 and lacks the hollows (66, 67, FIG. 4B) for the belt's hinge elements. Like the wider clamp 26 of FIG. 4B, the narrower clamp has an attachment hole 76 to accommodate the ratchet strap's hooks (39, FIG. 2). FIG. 7 shows a belt module 14 clamped by the clamp 72 between the domed head 52 of the movable jaw at the topside of the belt module and the fixed jaw at the bottom side of the module.

As shown in FIG. 6 (and also in FIGS. 4A and 4B for the wider clamp), a rear wall section 78 of the clamp's frame 80 that bounds the innermost extent of the clamp's throat 82 and defines the lateral depth of the throat is relatively thin. That allows the clamp 72 to clamp onto the side edge of a belt with only a small portion of the clamp extending outside the belt's side edge. In that way the clamp 72 can fit between the belt and sidewalls or other structures in the conveyor frame along the sides of the belts. As shown, the thickness of the rear wall section is less than the height of the opening 84 into the clamp 72, the narrowest height of the throat 82, and the thickness of the other portions of the C-shaped frame 80.

Figure 8A:
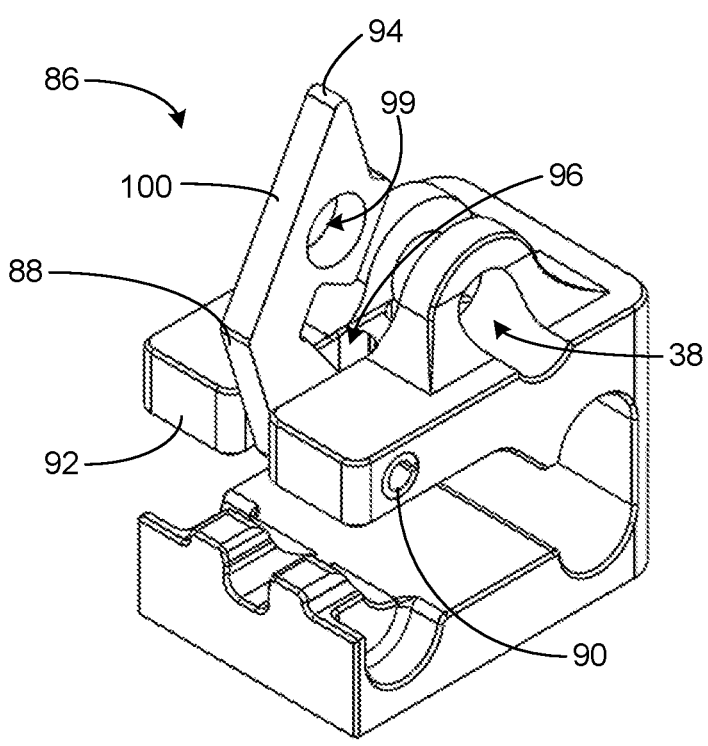
FIGS. 8A and 8B are isometric views of another version of a clamp similar to the clamp of FIGS. 4A and 4B and shown in unclamped and clamped states.
Figure 8B:
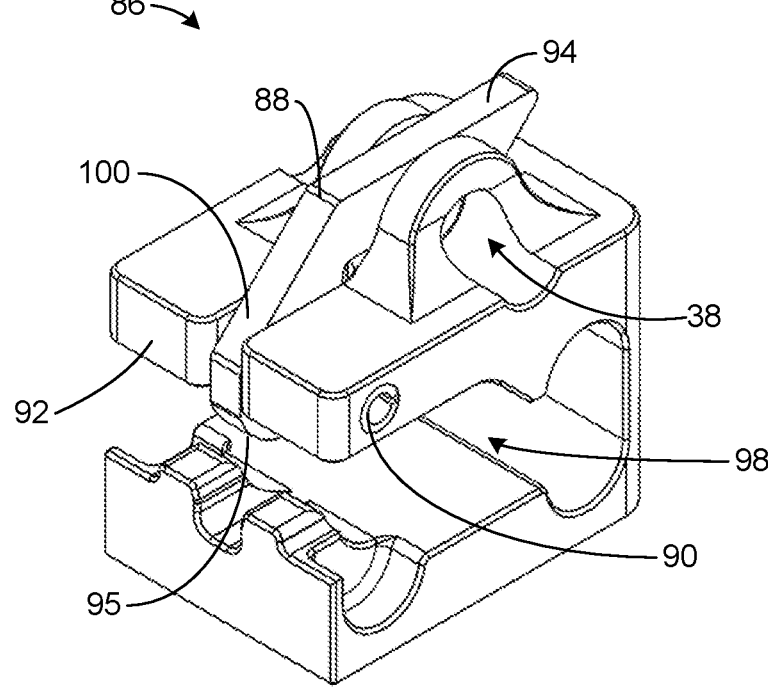

The clamp 86 shown in FIGS. 8A and 8B in unclamped and clamped states is similar to the clamp 26 of FIGS. 4A and 4B. They differ in that the screw 48 is replaced by a toggle cam latch 88 as the clamp's movable jaw. A pivot pin in the form of a split tube 90 extends through holes in the upper end 92 of the clamp's C-shaped frame on opposite sides of a slot 96 and through a hole in the cam latch 88. The split tube 90 spans the slot 96 and defines a pivot axis about which the cam latch 88 pivots. The cam latch 88 has a dogleg shape with a lever 94 as a jaw adjuster at an outer end and a cam 95 at the opposite inner end. The cam 95 forms the head of the movable jaw. The pivot hole of the cam latch 88 is near the cam 95, which is round and smooth to avoid marring the clamped belt edge. A slot 96 in the upper end of the C-shaped clamp 86 extends from the outer end of the C inward to provide the cam 95 a range of pivotal motion between the clamped and unclamped states. In the unclamped state of the clamp 86, shown in FIG. 8A, the lever 94 is in a raised position and the cam 95 is retracted inward and upward into the clamp's throat and out of contact with a belt. A belt received in the clamp's throat 98 is clamped by pressing the lever 94 downward and inward to a lowered position as in FIG. 8B. The rounded cam 95 rotates into tightening contact with the top surface of the belt and into the clamped position confronting the clamp's fixed jaw across the belt. A hole 99 through the lever 94, when aligned with the attachment holes 38 in the clamp's frame, admits a hook, pin, clip, or other attachment from an end of the ratchet strap. The attachment through the holes helps latch the clamped movable jaw 88 in place. A chamfered edge 100 on the cam latch 88 provides clearance for a belt during insertion and extraction from the clamp 86.

What is claimed is:
1. A belt closer comprising:
  a pair of clamps, each including:
    a C-shaped frame having:

5 a first end and a second end of the C shape spaced apart across an opening between the first and second ends into a throat in the interior of the C shape;

a rear wall section bounding the throat opposite the opening, wherein the throat extends from the opening to the rear wall section;

a fixed jaw formed by the first end;

an attachment point at the second end;

a movable jaw extending through the second end of the C shape proximate the opening and into the throat and having:

an outer end outside the C-shaped frame and an inner end in the throat of the C-shaped frame;

a jaw head at the inner end;

a jaw adjuster at the outer end that moves the jaw head toward the fixed jaw to a clamped position and away from the fixed jaw in an unclamped position;

a pulling tool having a first end attached to one of the clamps at its attachment point and a second end attached to the other of the clamps at its attachment point.

2. The belt closer as claimed in claim 1 wherein the jaw head is smooth.

3. The belt closer as claimed in claim 1 wherein the fixed jaw includes a pair of raised jaw pads separated by a channel extending from the opening and into the throat.

4. The belt closer as claimed in claim 3 wherein the C-shaped frame includes a lower inner pad deeper in the throat than the jaw pads and wherein the channel has a bottom flush with the lower inner pad.

5. The belt closer as claimed in claim 3 wherein the C-shaped frame includes hollows on the sides of the jaw pads opposite the channel.

6. The belt closer as claimed in claim 1 wherein the C-shaped frame includes a lower inner pad across the throat from an upper inner pad.

7. The belt closer as claimed in claim 1 wherein the C-shaped frame has a first side and an opposite second side and wherein the attachment point is formed by an eye hole through the C-shaped frame extending between the first side and the second side.

8. The belt closer as claimed in claim 7 comprising hooks or rings at the ends of the pulling tool that are received in the eye holes of the pair of clamps to attach the pulling tool to each of the clamps.

9. The belt closer as claimed in claim 1 wherein the thickness of the rear wall section is less than the height of the opening.

10. The belt closer as claimed in claim 1 wherein the C-shaped frame has a threaded through hole at the second end and wherein the movable jaw comprises a screw threaded through the threaded through hole and wherein the jaw adjuster is an adjustment head of the screw.

11. The belt closer as claimed in claim 1 wherein the C-shaped frame has a slot extending inward in the second end and a pivot pin spanning the slot and wherein the movable jaw comprises a cam latch pivotable in the slot about the pivot pin and comprising a cam at the inner end as the jaw head and a lever at the outer end as the jaw adjuster.

12. The belt closer as claimed in claim 1 wherein the pulling tool is a ratchet strap.

13. A belt-closer clamp comprising:

a C-shaped frame having:

6 a first end and a second end of the C shape spaced apart across an opening between the first and second ends into a throat in the interior of the C shape;

a rear wall section bounding the throat opposite the opening, wherein the throat extends from the opening to the rear wall section;

a fixed jaw formed by the first end;

a threaded through hole extending through the second end proximate the opening;

an attachment point at the second end;

a screw threaded through the through hole and having:

an outer end outside the C-shaped frame and an inner end in the throat of the C-shaped frame;

an adjustment head at the outer end of the screw for turning the screw to move the screw along the threaded through hole;

a jaw head at the inner end of the screw forming a movable jaw movable toward the fixed jaw to a clamped position and away from the fixed jaw in an unclamped position.

14. The belt-closer clamp as claimed in claim 13 wherein the jaw head is smooth.

15. The belt-closer clamp as claimed in claim 13 wherein the jaw head is an acorn nut.

16. The belt-closer clamp as claimed in claim 13 wherein the fixed jaw includes a pair of raised jaw pads separated by a channel extending from the opening and into the throat.

17. The belt-closer clamp as claimed in claim 16 wherein the C-shaped frame includes an inner pad deeper in the throat than the jaw pads and wherein the channel has a bottom flush with the inner pad.

18. The belt-closer clamp as claimed in claim 16 wherein the C-shaped frame includes hollows on the sides of the jaw pads opposite the channel.

19. The belt-closer clamp as claimed in claim 13 wherein the C-shaped frame includes a lower inner pad across the throat from an upper inner pad.

20. The belt-closer clamp as claimed in claim 13 wherein the C-shaped frame has a first side and an opposite second side and wherein the attachment point is formed by a hole through the C-shaped frame extending between the first side and the second side.

21. The belt-closer clamp as claimed in claim 13 wherein the thickness of the rear wall section is less than the height of the opening.

22. A belt-closer clamp comprising:

a C-shaped frame having:

a first end and a second end of the C shape spaced apart across an opening between the first and second ends into a throat in the interior of the C shape;

a rear wall section bounding the throat opposite the opening, wherein the throat extends from the opening to the rear wall section;

a fixed jaw formed by the first end;

a slot extending through the second end inward from the opening and toward the rear wall section;

a pivot pin spanning the slot;

a cam latch pivotably mounted in the slot on the pivot pin and having:

an outer end outside the C-shaped frame and an inner end in the throat of the C-shaped frame;

a lever at the outer end for pivoting the cam latch in the slot;

a cam at the inner end forming a movable jaw movable by the lever between a clamped position confronting the fixed jaw and an unclamped position deeper in the throat of the C-shaped frame.

23. The belt-closer clamp as claimed in claim 22 wherein the C-shaped frame has an eye hole through the C-shaped frame providing an attachment point.

24. The belt-closer clamp as claimed in claim 22 wherein the fixed jaw includes a pair of raised jaw pads separated by a channel extending from the opening and into the throat.

25. The belt-closer clamp as claimed in claim 24 wherein the C-shaped frame includes an inner pad deeper in the throat than the jaw pads and wherein the channel has a bottom flush with the inner pad.

26. The belt-closer clamp as claimed in claim 24 wherein the C-shaped frame includes hollows on the sides of the jaw pads opposite the channel.

27. The belt-closer clamp as claimed in claim 22 wherein the C-shaped frame includes a lower inner pad across the throat from an upper inner pad.

28. The belt-closer clamp as claimed in claim 22 wherein the thickness of the rear wall section is less than the height of the opening.

29. A method for pulling separated end sections of a modular conveyor belt together, the method comprising:

attaching a first pulling tool between a first pair of clamps;

attaching a second pulling tool between a second pair of clamps;

installing a first one of the first pair of clamps only at a first side edge of the belt in a first end section so that an edge portion of a first conveyor belt module in the first end section is between the clamp's jaws;

installing a second one of the first pair of clamps only at the first side edge of the belt in a second end section spaced apart from the first end section across a gap so that an edge portion of a first conveyor belt module in the second end section is between the clamp's jaws;

clamping the first and second ones of the first pair of clamps around the first conveyor belt modules of the first and second end sections;

installing a first one of the second pair of clamps only at a second side edge of the belt in the first end section so that an edge portion of a second conveyor belt module in the first end section is between the clamp's jaws;

installing a second one of the second pair of clamps only at the second side edge of the belt in the second end section so that an edge portion of a second conveyor belt module in the second end section is between the clamp's jaws;

clamping the first and second ones of the second pair of clamps around the second conveyor belt modules of the first and second end sections;

adjusting the first and second pulling tools to pull the first and second end sections together to close the gap.

30. The method as claimed in claim 29 comprising:

interleaving endmost hinge elements of the first end section with endmost hinge elements of the second end section;

inserting a hinge rod through the interleaved hinge elements of the first and second end sections to connect the first and second end section together to form an endless modular conveyor belt.

31. The method as claimed in claim 29 wherein the first pair of clamps are clamped to the first side edge so that the first and second conveyor belt modules in the first end section lie in a first belt row in the first end section and wherein the second pair of clamps are clamped to the second side edge so that the first and second conveyor belt modules in the second end section lie in the same belt row in a second belt row in the second end section.

32. The method as claimed in claim 31 wherein first pair of clamps are clamped to the first side edge and the second pair of clamps are clamped to the second side edge so that the first and second belt rows are not the endmost belt rows of the first and second end sections.

33. The method as claimed in claim 29 comprising positioning a rib at the bottom of each of the conveyor belt modules into a channel formed in a fixed jaw of each of the clamps to stabilize the first and second conveyor belt modules in the first and second end sections.

\* \* \* \* \*